US010140639B2

(12) United States Patent
Kruglick

(10) Patent No.: US 10,140,639 B2
(45) Date of Patent: Nov. 27, 2018

(54) DATACENTER-BASED HARDWARE ACCELERATOR INTEGRATION

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 735 days.

(21) Appl. No.: 14/373,625

(22) PCT Filed: Aug. 23, 2013

(86) PCT No.: PCT/US2013/056495
§ 371 (c)(1),
(2) Date: Jul. 21, 2014

(87) PCT Pub. No.: WO2015/026373
PCT Pub. Date: Feb. 26, 2015

(65) Prior Publication Data
US 2015/0261550 A1    Sep. 17, 2015

(51) Int. Cl.
G06Q 30/00 (2012.01)
G06Q 30/06 (2012.01)
G06F 9/455 (2018.01)
G06F 9/445 (2018.01)

(52) U.S. Cl.
CPC ..... *G06Q 30/0613* (2013.01); *G06F 9/44505* (2013.01); *G06F 9/45533* (2013.01); *G06Q 30/0621* (2013.01); *G06F 2009/4557* (2013.01); *G06F 2009/45562* (2013.01)

(58) Field of Classification Search
CPC ... G06F 2009/4557; G06F 2009/45562; G06F 9/44505; G06F 9/45533; G06Q 30/0613; G06Q 30/0621
See application file for complete search history.

(56) References Cited

U.S. PATENT DOCUMENTS

| 2003/0182423 | A1 | 9/2003 | Shafir et al. |
| 2005/0137998 | A1 | 6/2005 | Betts et al. |
| 2007/0299647 | A1* | 12/2007 | Bolcato ............... G06F 17/5036 703/14 |

(Continued)

OTHER PUBLICATIONS

"IBM Announces New Offerings to Help Organizations Drive Innovation While Managing Cost and Risk," PR Newswire: NA. PR Newswire Association LLC. (Jun. 7, 2010) (Year: 2010).*

(Continued)

*Primary Examiner* — Anne M Georgalas

(57) ABSTRACT

Technologies are generally provided to integrate hardware accelerators in datacenters. In some examples, a datacenter customer may provide a hardware accelerator configuration to be implemented at a datacenter. The hardware accelerator configuration may include, for example, one or more customer accelerator blocks and one or more accelerator blocks. The datacenter may retrieve the accelerator block(s), integrate the accelerator block(s) with the customer accelerator block(s) to form the hardware accelerator, and then implement the hardware accelerator. In other examples, the datacenter may charge the customer for use of the accelerator block(s), but refrain from providing the accelerator block(s) to the customer.

17 Claims, 8 Drawing Sheets

(56) References Cited

U.S. PATENT DOCUMENTS

| | | | | |
|---|---|---|---|---|
| 2009/0292654 | A1* | 11/2009 | Katiyar | G06Q 30/04 705/412 |
| 2011/0093847 | A1* | 4/2011 | Shah | G06F 9/45558 718/1 |
| 2011/0145318 | A1* | 6/2011 | Krishnamurthy | G06F 9/5027 709/203 |
| 2011/0246627 | A1* | 10/2011 | Kern | G06F 9/5072 709/220 |
| 2011/0264558 | A1 | 10/2011 | Alexandrou | |
| 2012/0054236 | A1* | 3/2012 | Branscome | G06F 17/30519 707/770 |
| 2012/0158821 | A1* | 6/2012 | Barros | G06F 17/30563 709/203 |
| 2013/0145431 | A1 | 6/2013 | Kruglick | |
| 2013/0232229 | A1* | 9/2013 | Firman | G06F 8/61 709/219 |
| 2014/0324650 | A1* | 10/2014 | Bligh | G06Q 20/14 705/34 |

OTHER PUBLICATIONS

"Algotronix," accessed at http://web.archive.org/web/20130209012423/http://algotronix.com/index_noflash.html, accessed on Jul. 17, 2014, p. 1.

"Design of High-end FPGA devices integrating your or our IP blocks," Barco Silex, accessed at http://www.barco-silex.com/electronic-design-service/fpga-design, accessed on Apr. 17, 2013, pp. 1-2.

"FPGA Programming and how does IP Core licensing work?," accessed at http://web.archive.org/web/20091223091848/http://stackoverflow.com/questions/1917222/fpga-programming-and-how-does-ip-core-licensing-work, accessed on Jul. 17, 2014, pp. 5.

"Idea to Entrepreneurship," Nimbix, Mar. 10, 2012, pp. 1-15.

"Reduce Risk and Speed Time-to-Market with High Quality IP," Synopsys, accessed at http://web.archive.org/web/20130718182035/http://www.synopsys.com/IP/Pages/default.aspx, accessed on Jul. 17, 2014, pp. 1-2.

"Semiconductor intellectual property core," Wikipedia, accessed at http://web.archive.org/web/20130204234104/http://en.wikipedia.org/wiki/Semiconductor_intellectual_property_core, last modified on Jan. 10, 2013, pp. 1-5.

"Synopsys FPGA Licensing," User Guide, Version C-2009.03, pp. 96 (Mar. 2009).

"Synplicity FPGA Design Solution," Rapid Development and Verification of FPGAs, accessed at http://web.archive.org/web/20121015070645/http://www.synopsys.com/Solutions/EndSolutions/FPGASolution/Pages/default.aspx, accessed on Jul. 17, 2014, p. 1.

Bacon, D. F., et al., "FPGA Programming for the Masses," ACM Association for Computing Machinery, pp. 1-13 (Feb. 2013).

Desmouliers, C. et al., "Image and Video Processing Platform for Field Programmable Gate Arrays Using a High-level Synthesis," IET Computers & Digital Techniques, vol. 6, No. 6, pp. 414-425 (Nov. 2012).

"IPNet, National Instruments," accessed at http://web.archive.org/web/20130809020031/http://www.ni.com/ipnet/, accessed on Jul. 14, 2014, pp. 2.

Kean, T., "Cryptographically Enforced Pay-Per-Use Licensing of FPGA Design Intellectual Property," Algotronix Ltd., Edinburgh UK, accessed at http://web.archive.org/web/20130803150837/http://www.design-reuse.com/articles/5504/cryptographically-enforced-pay-per-use-licensing-of-fpga-design-intellectual-property.html, accessed on Jul. 17, 2014, pp. 6.

Kepner, J., "High Performance Embedded Computing Software Initiative (HPEC-SI)," accessed at http://web.archive.org/web/20051221154509/http://www.hpec-si.org/030403-HPEC-SI-GOMAC.ppt, accessed on Jul. 17, 2014, pp. 1-41.

Kirk, B., "The True Cost of Free FPGA IP," Electronic Design, pp. 2 (Aug 2007).

Moradi, A., et al., "On the Portability of Side-Channel Attacks," Cryptology ePrint Archive: Report 2011/391, pp. 3.

Moradi, A., et al., "On the Vulnerability of FPGA Bitstream Encryption Against Power Analysis Attacks," Extracting Keys from Xilinx Virtex-II FPGAs, In Proceedings of the 18th ACM Conference on Computer and Communications Security, pp. 13 (2011).

Siozios, K., et al., "DAGGER: A Novel Generic Methodology for FPGA Bitstream Generation and Its Software Tool Implementation," In Parallel and Distributed Processing Symposium, Proceedings. 19th IEEE International, p. 165b, Apr. 2005.

Webb, J. B., "Methods for Securing the Integrity of FPGA Configurations," Bradley Department of Electrical and Computer Engineering Blacksburg, Virginia, pp. 90 (Aug. 2006).

Yu, C-L., et al., "Multidimensional DFT IP Generator for FPGA Platforms," IEEE Transactions on Circuits and Systems, vol. 58, Issue 4, pp. 755-764 (2011).

International Search Report with Written Opinion for International Application No. PCT/US2013/056495 dated May 2, 2005.

* cited by examiner

COMPUTER PROGRAM PRODUCT 800

SIGNAL-BEARING MEDIUM 802

804 AT LEAST ONE OF

ONE OR MORE INSTRUCTIONS FOR RECEIVING CUSTOMER ACCELERATOR BLOCK(S) FOR A HARDWARE ACCELERATOR CONFIGURATION FROM A CUSTOMER;

ONE OR MORE INSTRUCTIONS FOR DETERMINING THAT THE CONFIGURATION SPECIFIES OTHER ACCELERATOR BLOCK(S);

ONE OR MORE INSTRUCTIONS FOR RETRIEVING THE OTHER ACCELERATOR BLOCK(S);

ONE OR MORE INSTRUCTIONS FOR FORMING A HARDWARE ACCELERATOR BY INTEGRATING THE CUSTOMER ACCELERATOR BLOCK(S) AND THE OTHER ACCELERATOR BLOCK(S) ACCORDING TO THE CONFIGURATION WHILE REFRAINING FROM PROVIDING THE OTHER ACCELERATOR BLOCK(S) TO THE CUSTOMER; AND

ONE OR MORE INSTRUCTIONS FOR IMPLEMENTING THE HARDWARE ACCELERATOR.

| COMPUTER-READABLE MEDIUM 806 | RECORDABLE MEDIUM 808 | COMMUNICATIONS MEDIUM 810 |
|---|---|---|

FIG. 8

DATACENTER-BASED HARDWARE ACCELERATOR INTEGRATION

CROSS-REFERENCE TO RELATED APPLICATION

This Application is the U.S. National Stage filing under 35 U.S.C. § 371 of International Application No. PCT/US13/56495, filed on Aug. 23, 2013. International Application No. PCT/US13/56495 is herein incorporated by reference in its entirety.

BACKGROUND

Unless otherwise indicated herein, the materials described in this section are not prior art to the claims in this application and are not admitted to be prior art by inclusion in this section.

The use of hardware accelerators in datacenters to improve the performance and efficiency of datacenter applications is becoming more common. For example, datacenter application developers may design hardware accelerators to provide increased computing efficiency and lower operating costs for parallelizable processes in their applications.

A datacenter application developer may design a hardware accelerator to include multiple accelerator components or blocks. In some circumstances, a developer may design a hardware accelerator to include both custom elements and hardware accelerator blocks, which may be available from an accelerator intellectual property (IP) marketplace. As a result, the developer may be able to take advantage of external accelerator development (in the form of accelerator blocks) while maintaining overall hardware accelerator integration.

SUMMARY

The present disclosure generally describes techniques for integrating hardware accelerators in a datacenter.

According to some examples, a method is provided to integrate hardware accelerators in a datacenter. An example method may include receiving a customer accelerator block for a hardware accelerator configuration, retrieving the other accelerator block upon determining that the hardware accelerator configuration specifies another accelerator block, forming a hardware accelerator by integrating the customer accelerator block and the other accelerator block at the datacenter according to the hardware accelerator configuration while refraining from providing the other accelerator block to a datacenter customer associated with the customer accelerator block, and deploying the hardware accelerator on a hardware acceleration module at the datacenter.

According to other examples, an accelerator assembly module is provided to integrate hardware accelerators in a datacenter. An example accelerator assembly module may include a processing module, an accelerator intake module, and an acceleration integration module. The processing module may be configured to receive a customer accelerator block for a hardware accelerator configuration and determine that the hardware accelerator configuration specifies another accelerator block. The accelerator intake module may be configured to retrieve the other accelerator block. The accelerator integration module may be configured to form a hardware accelerator by integrating the customer accelerator block and the other accelerator block at the datacenter according to the hardware accelerator configuration, cause the hardware accelerator to be deployed on a hardware acceleration module at the datacenter, and refrain from providing the other accelerator block to a datacenter customer associated with the customer accelerator block.

According to further examples, a cloud-based datacenter is provided to integrate hardware accelerators locally. An example datacenter may include at least one virtual machine (VM) operable to be executed on one or more physical machines, a hardware acceleration module associated with the at least one VM, and a datacenter controller. The datacenter controller may be configured to receive a customer accelerator block for a hardware accelerator configuration, retrieve the other accelerator block in response to a determination that the hardware accelerator configuration specifies another accelerator block, form a hardware accelerator by integrating the customer accelerator block and the other accelerator block locally according to the hardware accelerator configuration while refraining from providing the other accelerator block to a datacenter customer associated with the customer accelerator block, and deploy the hardware accelerator on the hardware acceleration module.

According to yet other examples, a computer readable medium may store instructions for integrating hardware accelerators in a datacenter. Example instructions may include receiving a customer accelerator block for a hardware accelerator configuration, retrieving the other accelerator block upon determining that the hardware accelerator configuration specifies another accelerator block, forming a hardware accelerator by integrating the customer accelerator block and the other accelerator block at the datacenter according to the hardware accelerator configuration white refraining from providing the other accelerator block to a datacenter customer associated with the customer accelerator block, and deploying the hardware accelerator on a hardware acceleration module at the datacenter.

According to yet further examples, an accelerator marketplace system configured to supply accelerator blocks to customers is provided. An example marketplace system may include a data store configured to store a plurality of third-party accelerator blocks and one or more servers configured to execute a customer account management module and a delivery module. The customer account management module may allow a customer to select at least one of the plurality of third-party accelerator blocks and provide at least one accelerator-block-delivery instruction specifying a destination. The delivery module may deliver the selected at least one of the plurality of third-party accelerator blocks to the destination based on the at least one accelerator-block-delivery instruction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
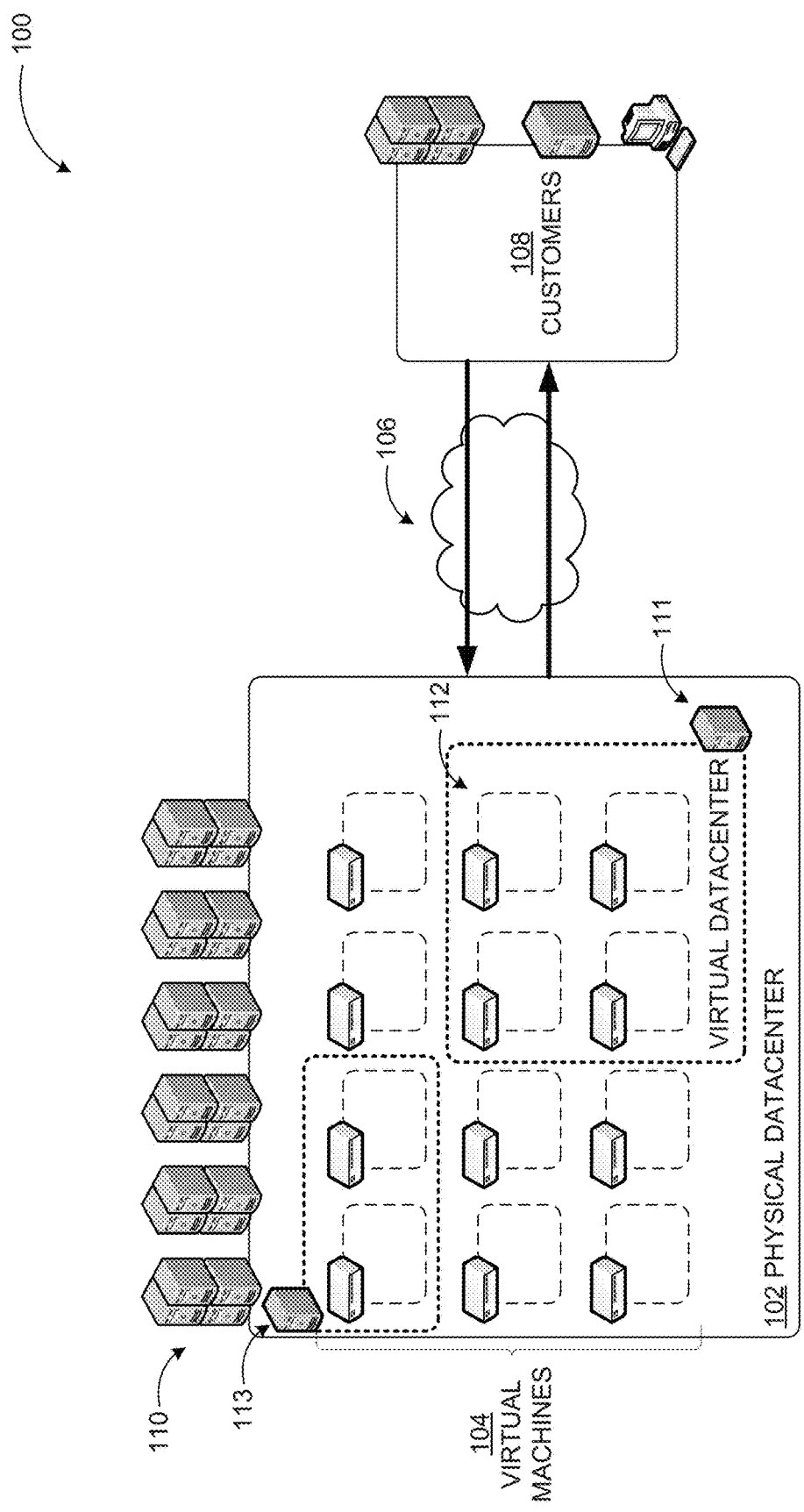
FIG. 1 illustrates an example datacenter-based system where integration of hardware accelerators may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to hardware accelerator integration in a datacenter.

Briefly stated, technologies are generally provided to integrate hardware accelerators in datacenters. In some examples, a datacenter customer may provide a hardware accelerator configuration to be implemented at a datacenter. The hardware accelerator configuration may include, for example, one or more customer accelerator blocks and one or more accelerator blocks. The datacenter may retrieve the accelerator block(s), integrate the accelerator block(s) with the customer accelerator blocks) to form the hardware accelerator, and then implement the hardware accelerator. In other examples, the datacenter may charge the customer for use of the accelerator block(s), but refrain from providing the accelerator block(s) to the customer.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that customers like the retail service may move their hosted services/applications from one datacenter to another without their users noticing a difference.

FIG. 1 illustrates an example datacenter-based system where integration of hardware accelerators may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

According to some embodiments, a customer with an application that is executed at the physical datacenter 102 may wish to implement a hardware accelerator at the datacenter 102 to increase application efficiency and/or lower application operating costs. In some situations, hardware accelerator development time may be shortened by taking advantage of accelerators. For example, the customer may integrate customer-designed hardware accelerator blocks with hardware accelerator blocks purchased from vendors to create the final hardware accelerator implementation. While such integration may decrease development time, purchasing hardware accelerator blocks may involve providing significant upfront costs. Since accelerator blocks may be sold as digital files, a purchasing customer may be able to make unlimited copies of the accelerator block files, and even distribute the files without providing appropriate payment to the vendors. As a result, accelerator block vendors may charge significant upfront fees because of this inability to monitor or control usage of the accelerator blocks after they are purchased.

Figure 2:
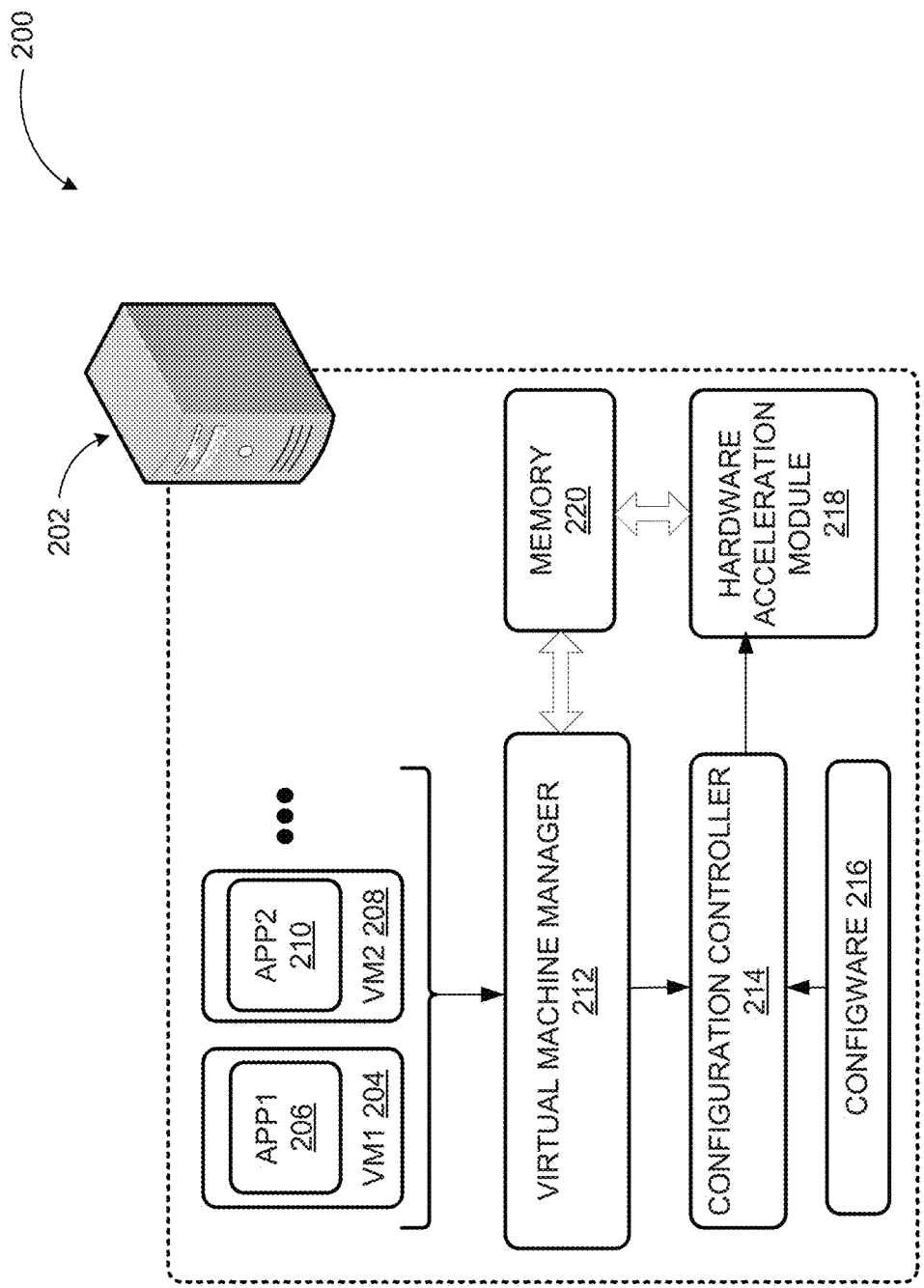
FIG. 2 illustrates an example system at a datacenter where hardware accelerators may be implemented.

FIG. 2 illustrates an example system at a datacenter where hardware accelerators may be implemented, arranged in accordance with at least some embodiments described herein.

As shown in a diagram 200, a physical server 202 (e.g., the physical servers 110, 111, or 113 in FIG. 1) may be configured to execute a number of virtual machines, such as a first virtual machine 204, a second virtual machine 208, and other virtual machines (not shown). Each of the virtual machines may execute one or more applications. For example, the first virtual machine 204 may execute a first application 206 and the second virtual machine 208 may execute a second application 210. A virtual machine manager (VMM) 212 may be configured to manage the virtual machines and load applications onto the virtual machines. For example, the VMM 212 may load the first application 206 and the second application 210 onto the first virtual machine 204 and the second virtual machine 208, respectively.

The physical server 202 may also include a hardware acceleration module 218. The hardware acceleration module 218 may be configured to implement hardware accelerators to increase computing efficiency and lower operating costs for parallelizable processes or applications. In some embodiments, the hardware acceleration module 218 may include a field-programmable gate array (FPGA) having multiple logic cells or digital units, which may be combined to form circuits and/or processors with various functionalities. A configuration controller 214 may be configured to load one or more hardware accelerators (e.g., as one or more configware or configuration files, described in more detail below) onto the hardware acceleration module 218. In some embodiments, each hardware accelerator loaded on the hardware acceleration module 218 may be associated with one or more applications implemented on the virtual machines. For example, one hardware accelerator may be associated with the first application 206 and another hardware accelerator may be associated with the second application 210. In some embodiments, the virtual machines 204, 208 may transfer part of their computing loads to the associated hardware accelerators on the hardware acceleration module 218 by, for example, communicating data via a system memory 220. This may increase the computing efficiency and speed of the virtual machines 204, 208 and the applications 206, 210.

In some embodiments, the configuration controller 214 may be configured to load hardware accelerators onto the hardware acceleration module 218 based on one or more configuration programs or configware 216, which may be stored in memory. The configware 216 may include descriptor files for hardware accelerators to be loaded onto the hardware acceleration module 218. For example, the descriptor files in the configware 216 may list, the various digital elements and inputs/outputs to be connected on the hardware acceleration module 218 in order to load a particular hardware accelerator on the hardware acceleration module 218. In some embodiments, the descriptor files may take the form of hardware descriptor language (HDL) files, which may be compiled to provide netlist files. The netlist files in turn may include detailed lists of connections and elements of the hardware accelerator circuits. Formats other than HDL may also be used for implementing various embodiments. In some embodiments, the configware 216 may also (or instead) include binary files corresponding to hardware accelerators, for example compiled from the appropriate descriptor files.

Figure 3:
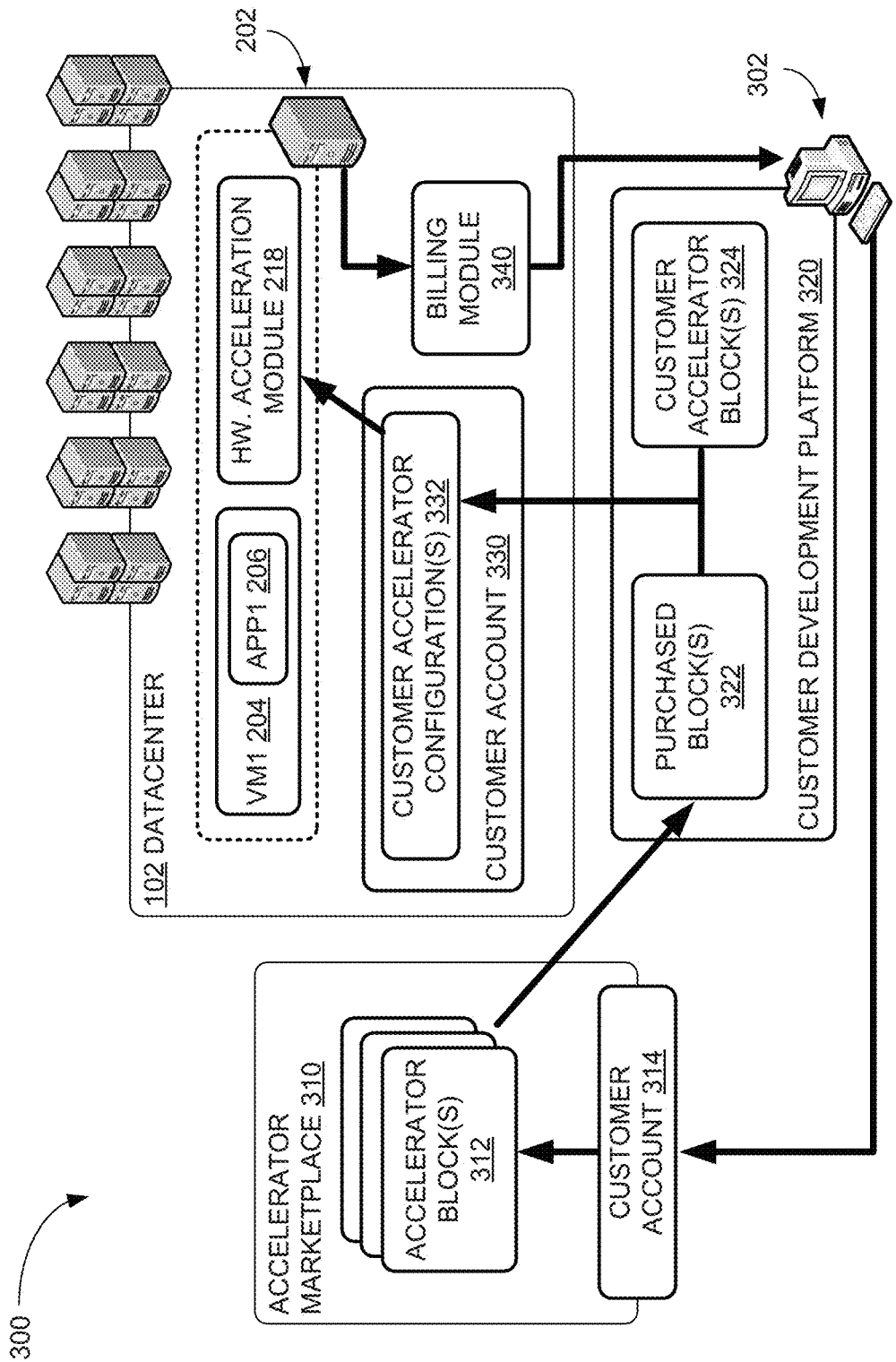
FIG. 3 illustrates an example system where a customer may interact with an accelerator marketplace for integration of hardware accelerators to be implemented at a datacenter.

FIG. 3 illustrates an example system where a customer may interact with an accelerator marketplace for integration of hardware accelerators to be implemented at a datacenter, arranged in accordance with at least some embodiments described herein.

A diagram 300 shares some similarities with diagrams 100 and 200 in FIGS. 1 and 2, respectively, and similarly numbered elements behave likewise. As shown in the diagram 300, a customer 302 of the datacenter 102 may implement the first application 206 on the first virtual machine 204 at the physical server 202, as described above. In addition, the customer 302 may wish to implement a hardware accelerator on the hardware acceleration module 218, for example to increase the computing efficiency of the first virtual machine 204 and/or the first application 206. The customer 302 may use a customer development platform 320 to develop the hardware accelerator by integrating different accelerator blocks together. The hardware accelerator may include one or more customer accelerator blocks 324 developed by the customer 302, such as a custom accelerator front end (e.g., for inputs from VM application) and/or a custom accelerator back end (e.g., to provide outputs to VM applications).

The hardware accelerator may also include one or more other accelerator blocks from one or more different accelerator block vendors in order to decrease overall accelerator development time. Accelerator blocks 312 may be available from an accelerator marketplace 310. The customer 302, which has a customer account 314 at the accelerator marketplace 310, may purchase one or more accelerator blocks 322 from one or more vendors for integration into the hardware accelerator. Once purchased, the accelerator block(s) 322 may be delivered to the customer 302, who may then use the customer development platform 320 to integrate the purchased blocks 322 with the customer accelerator block(s) 324 to form the desired hardware accelerator. For example, the customer development platform 320 may use netlist, place-and-route, and/or simulation techniques to create settings and netlists for the desired hardware accelerator that work on different hardware. In some embodiments, the hardware accelerator generation may begin with a hardware-independent form with code in a hardware description language (HDL). The HDL code may then be processed using technology and vendor-specific electronic design automation (EDA) tools to generate hardware-specific netlist files. The netlist files may then be place-and-routed and validated using timing analysis, simulation, or other verification techniques to form a final hardware accelerator binary file.

The completed hardware accelerator may then be provided to the datacenter in the form of one or more customer accelerator configurations 332, which may be similar to the configware 216 described above. The customer accelerator configuration(s) 332 may be provided to the datacenter 102 via a customer account 330 associated with the customer 302. The datacenter 102 in turn may use the customer accelerator configuration(s) 332 to implement the customer hardware accelerator on the hardware acceleration module 218 at the physical server 202 as described above. The physical server 202 or a virtual machine manager operating on the physical server 202 (e.g., virtual machine manager 212) may then communicate with a billing module 340 at the datacenter 102 to bill or charge the customer 302 for usage of datacenter hardware and/or software resources.

While the hardware accelerator integration described in the diagram 300 may succeed in implementing the desired hardware accelerator at the datacenter 102, purchasing the accelerator block(s) 322 may involve a significant upfront cost, as described above. An alternative to the approach discussed in conjunction with FIG. 3 is described below, in FIG. 4.

Figure 4:
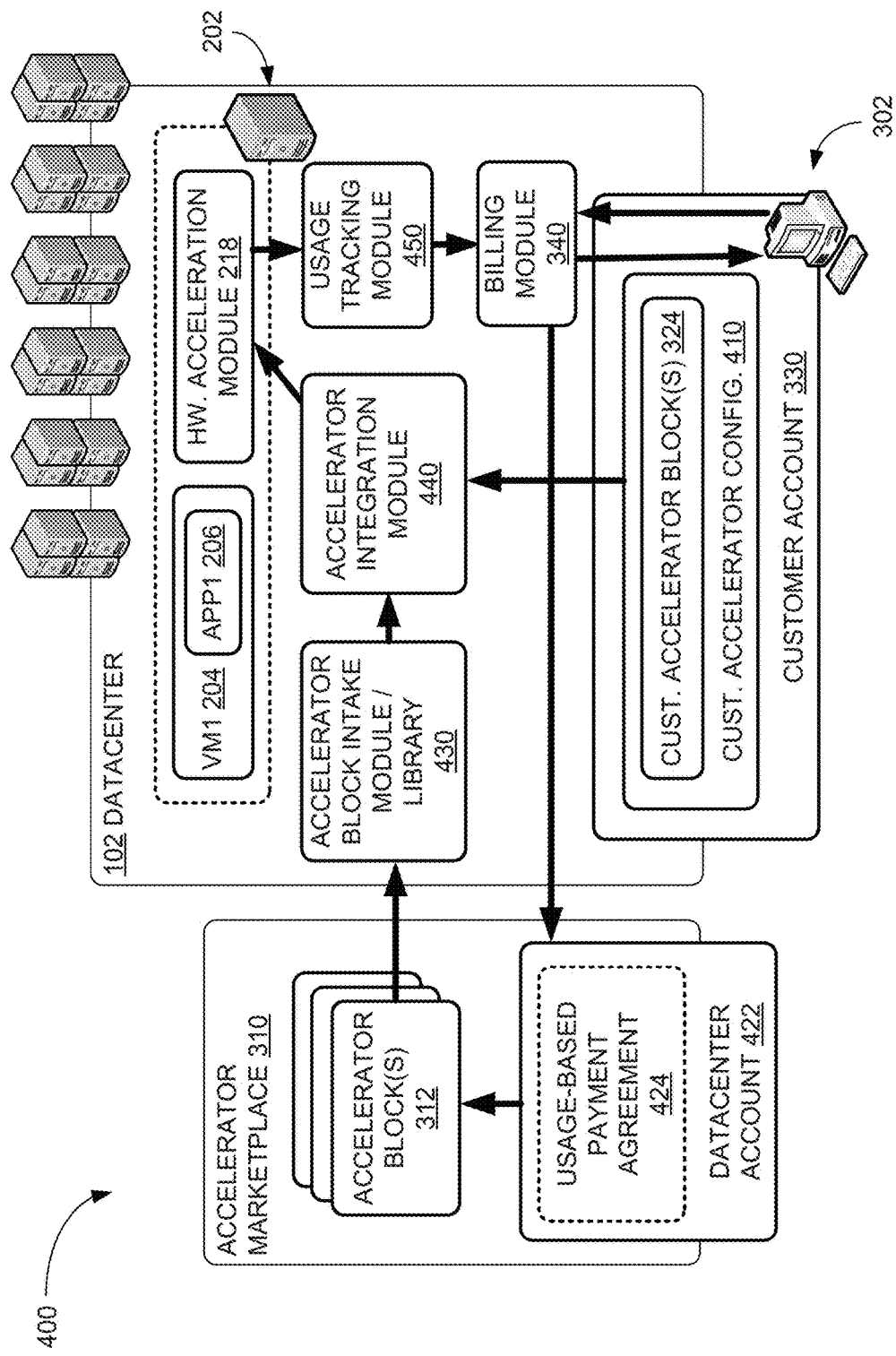
FIG. 4 illustrates an example system where a datacenter may interact with an accelerator marketplace for integration of hardware accelerators to be implemented at the datacenter.

FIG. 4 illustrates an example system where a datacenter may interact with an accelerator marketplace for integration of hardware accelerators to be implemented at the datacenter, arranged in accordance with at least some embodiments described herein.

A diagram 400 shares some similarities with diagrams 100, 200, and 300 in FIGS. 1, 2, and 3, respectively, with similarly numbered elements behaving similarly. As shown in the diagram 400, the customer 302 may wish to implement a hardware accelerator at the datacenter 102, represented as one or more customer accelerator configurations 410. The customer accelerator configuration(s) 410 may include the one or more customer accelerator blocks 324, and may specify one or more accelerator blocks to be included in the hardware accelerator, as described above in conjunction with FIG. 3. However, instead of the customer 302 purchasing and integrating the accelerator blocks and the customer accelerator blocks 324, as was the case in FIG. 3, the datacenter 102 may do so. In some embodiments, the customer 302 may provide the customer accelerator configuration(s) 410 and the customer accelerator blocks 324 to the datacenter 102 via the customer account 300. In turn, the datacenter 102, which may have a datacenter account 422 at the accelerator marketplace, may acquire the accelerator blocks specified in the customer accelerator configuration(s) 410. In some embodiments, the datacenter account 422 may have an associated usage-based payment agreement 424, which may allow the datacenter to in effect "rent" accelerator blocks without having to pay the full upfront cost. In exchange, the datacenter 102 may agree to exert control over the "rented" accelerator blocks to prevent unauthorized copying or distribution. For example, the datacenter 102 may refrain from providing the hardware accelerator blocks to customers. Instead, the datacenter 102 may store accelerator blocks in an accelerator block intake module (or library) 430 that is not accessible to customers.

When the datacenter 102 receives the customer accelerator block(s) 324 and the customer accelerator configuration (s) 410 specifying one or more accelerator blocks, the datacenter 102 may determine which accelerator blocks are specified. The datacenter 102 may then retrieve the specified accelerator blocks. In some embodiments, the datacenter 102 may first determine whether the specified accelerator blocks are stored at the accelerator block intake module 430. In response to determining that the specified accelerator blocks are not stored, the datacenter 102 or the accelerator block intake module 430 may retrieve the accelerator blocks from the accelerator marketplace 310, as described above. Upon retrieval, the accelerator block intake module 430 may store the accelerator blocks at least temporarily.

Subsequently, an accelerator integration module 440 may receive the customer accelerator configuration(s) 410, the customer accelerator block(s) 324, and the specified accelerator block(s). The accelerator integration module 440 may determine how the customer accelerator block(s) 324 and the accelerator block(s) are to be integrated into a hardware accelerator based on the provided customer accelerator configuration(s) 410. In some embodiments, the integration process may be similar to how the customer 302 uses the customer development platform 320 to form a desired hardware accelerator. The customer accelerator configuration(s) 410, in addition to specifying accelerator blocks, may also specify how the accelerator blocks are to be connected or linked to the customer accelerator block(s) 324. For example, the customer accelerator configuration(s) 410 may specify particular input and/or output nodes in the accelerator blocks and the customer accelerator block(s) 324 that are to be connected, or particular settings for the accelerator blocks.

After the accelerator integration module 440 generates the hardware accelerator, the datacenter 102 may deploy the generated hardware accelerator on the hardware acceleration module 218. A usage tracking module 450 may then track the usage of the deployed hardware accelerator, for example based on usage time, number of times used, a combination of the two, or any other suitable parameter(s). The usage tracking module 450 may then provide usage tracking information to a billing module 340 that charges the customer 302 based on the tracked usage of the hardware accelerator (and the included accelerator blocks). In some embodiments, the datacenter 102 (or the billing module 340) may provide a discount to the customer 302 for purposes of testing and verifying the datacenter-integrated hardware accelerator. This may be in the form of a reduced rate, some initial period of free hardware accelerator usage, some initial period of low-traffic hardware accelerator usage, or any suitable discount. The billing module 340 may then receive payment from the customer 302 and forward a portion of the received payment to the vendor(s) of the accelerator blocks to pay for usage of the accelerator blocks. In some embodiments, the billing module 340 may forward the payment to the vendor(s) via the datacenter account 422 at the accelerator marketplace 310.

Figure 5:
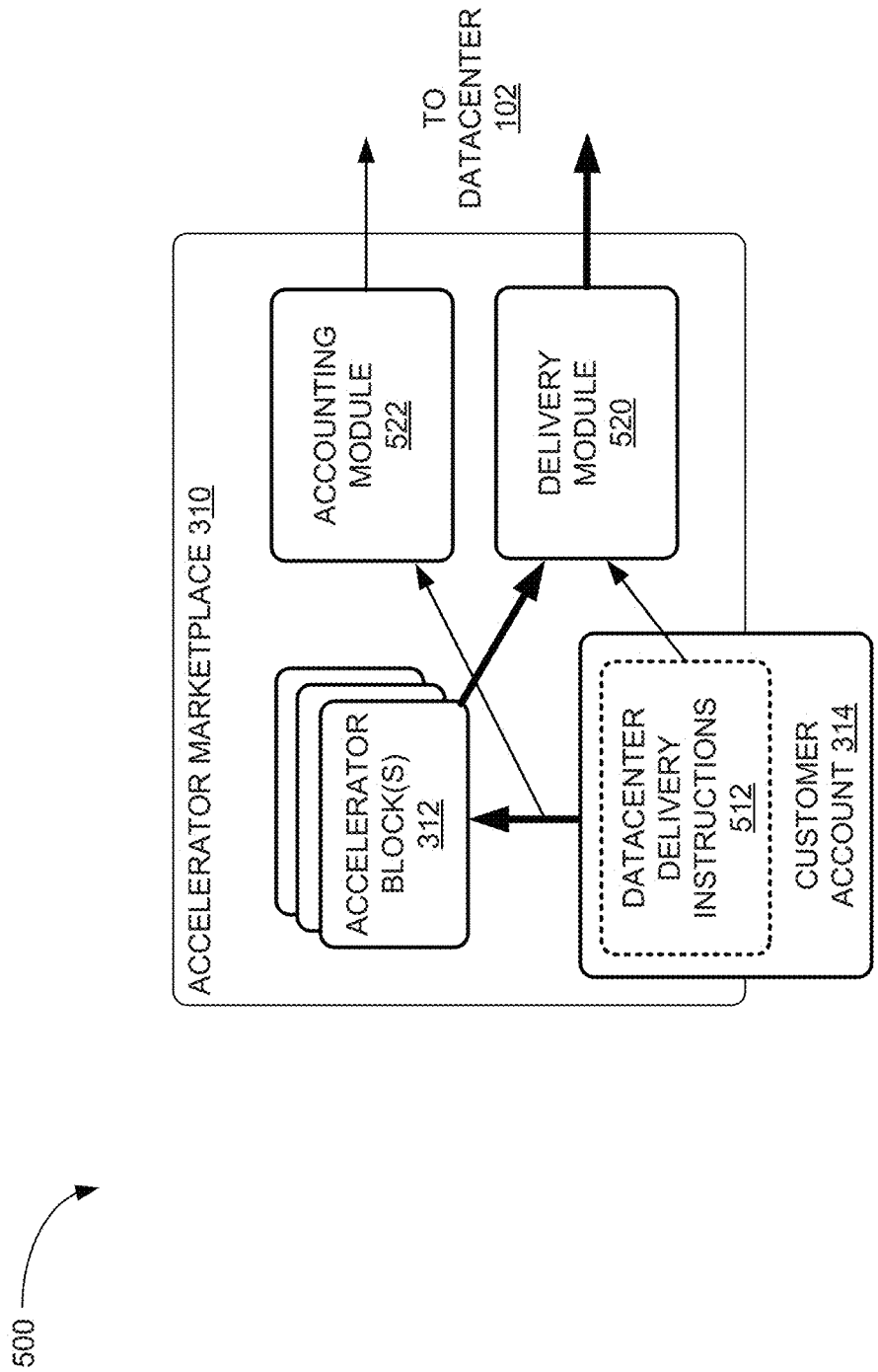
FIG. 5 illustrates another example accelerator marketplace.

FIG. 5 illustrates another example accelerator marketplace, arranged in accordance with at least some embodiments described herein.

A diagram 500 shares some similarities with diagram 300 in FIG. 3, with similarly numbered elements behaving similarly. As shown in the diagram 500, a customer (e.g., the customer 302) may use the customer account 314 at the accelerator marketplace 310 to select one or more desired accelerator blocks for a hardware accelerator in some examples. However, instead of delivering the accelerator blocks to the customer 302, the accelerator marketplace 310 may allow the datacenter 102 (e.g., the accelerator block intake module 430) to directly retrieve the accelerator blocks, in some embodiments, the customer account 314 may have associated datacenter delivery instructions 512 that provide information about the datacenter to which the accelerator blocks are to be delivered. The datacenter delivery instructions 512 may be provided to a delivery module 520 at the accelerator marketplace 310, which then delivers the desired accelerator blocks to the datacenter 102 according to the instructions 512. In these embodiments, the customer account 314 may also have an associated usage-based payment agreement (e.g., similar to the usage-based payment agreement 424), in exchange for having the accelerator blocks directly provided to the datacenter 102.

In some embodiments, an accounting module 522 at the accelerator marketplace 310 may collect and correlate information about customer account 314, the desired accelerator blocks, and/or the datacenter to which the accelerator blocks are to be delivered. This data processing may be performed to track business relationship data, such as datacenter/customer use of accelerator blocks or the accelerator marketplace, customer use of datacenters, or any other suitable business metric. In some embodiments, the accounting module 522 may be associated with the datacenter 102, and may transmit the collected data to the datacenter 102. In other embodiments, the accounting module 522 may be associated with the accelerator marketplace 310 and/or accelerator block vendors.

Figure 6:
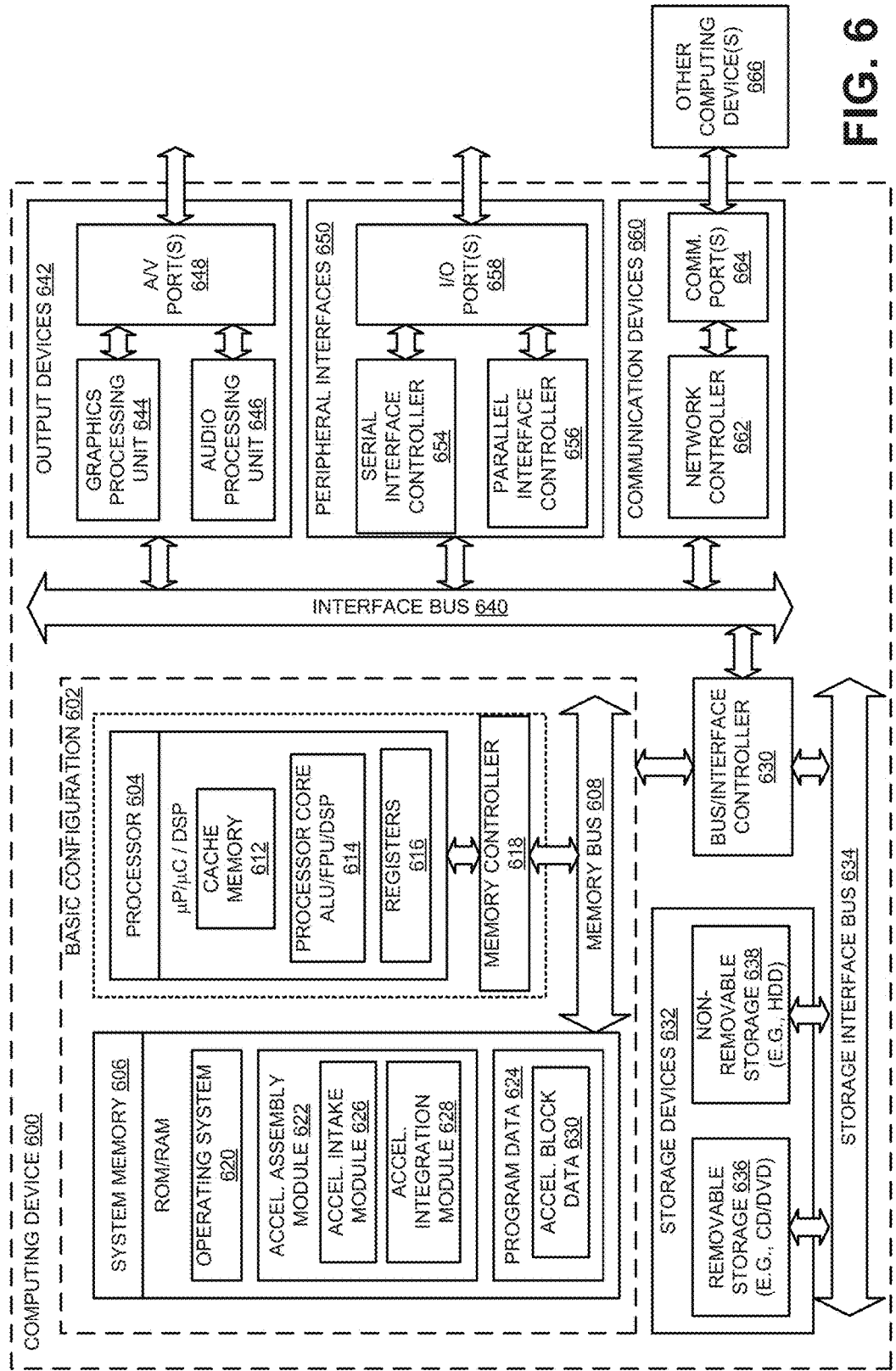
FIG. 6 illustrates a general purpose computing device, which may be used to provide integration of hardware accelerators in a datacenter.

FIG. 6 illustrates a general-purpose computing device, which may be used to provide integration of hardware accelerators in a datacenter, arranged in accordance with at least some embodiments described herein.

For example, the computing device 600 may be used to integrate hardware accelerators in a datacenter as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, an accelerator assembly module 622, and program data 624. The accelerator assembly module 622 may include an accelerator intake module 626 to retrieve accelerator blocks and an accelerator integration module 628 to integrate accelerator blocks as described herein. The program data 624 may include, among other data, accelerator block data 630 or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
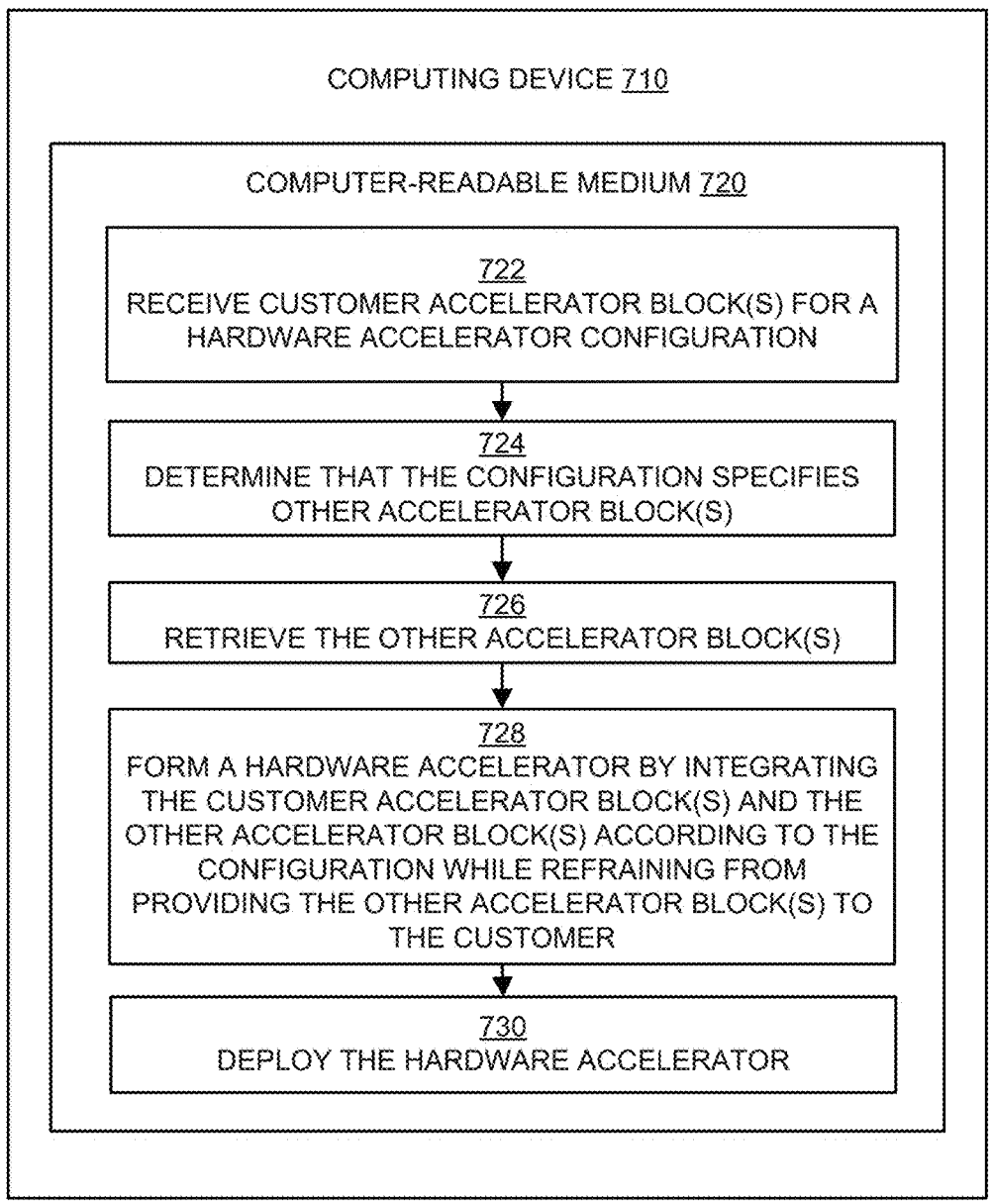
FIG. 7 is a flow diagram illustrating an example method for integrating hardware accelerators in a datacenter that may be performed by a computing device such as the computing device in FIG. 6.

FIG. 7 is a flow diagram illustrating an example method for integrating hardware accelerators in a datacenter that may be performed by a computing device such as the computing device in FIG. 6, arranged in accordance with at least some embodiments described herein.

Example methods may include one or more operations, functions or actions as illustrated by one or more of blocks 722, 724, 726, 728, and/or 730, and may in some embodiments be performed by a computing device such as the computing device 600 in FIG. 6. The operations described in the blocks 722-730 may also be stored as computer-executable instructions in a computer-readable medium such as a computer-readable medium 720 of a computing device 710.

An example process for integrating hardware accelerators in a datacenter may begin with block 722, "RECEIVE CUSTOMER ACCELERATOR BLOCK(S) FOR A HARDWARE ACCELERATOR CONFIGURATION", where a datacenter (e.g., the datacenter 102) may receive customer accelerator blocks (e.g., the customer accelerator blocks 324) associated with a customer hardware accelerator configuration from, for example, a customer, as described above. The customer accelerator blocks and accelerator configuration may be received from a customer account (e.g., the customer account 330), and may be received by an accelerator integration module (e.g., the accelerator integration module 440) at the datacenter.

Block 722 may be followed by block 724, "DETERMINE THAT THE CONFIGURATION SPECIFIES OTHER ACCELERATOR BLOCK(S)", where the datacenter may determine that the received customer accelerator configuration specifies one or more accelerator blocks to be integrated with the customer accelerator blocks to form the final hardware accelerator, as described above.

Block 724 may be followed by block 726, "RETRIEVE THE OTHER ACCELERATOR BLOCK(S)", where the datacenter retrieves the specified accelerator blocks from a local repository (e.g., the accelerator block intake module 430) or from an accelerator marketplace e.g., the accelerator marketplace 310) as described above.

Block 726 may be followed by block 728, "FORM A HARDWARE ACCELERATOR BY INTEGRATING THE CUSTOMER ACCELERATOR BLOCK(S) AND THE OTHER ACCELERATOR BLOCK(S) ACCORDING TO THE CONFIGURATION WHILE REFRAINING FROM PROVIDING THE OTHER ACCELERATOR BLOCK(S) TO THE CUSTOMER." An accelerator integration module may integrate the received customer accelerator blocks and the retrieved accelerator blocks according to the provided customer accelerator configuration to form the hardware accelerator at block 728. As described above, the datacenter may retrieve the accelerator blocks and integrate them into the hardware accelerator without providing the accelerator blocks to the customer.

Block 728 may be followed by block 730, "DEPLOY THE HARDWARE ACCELERATOR", where the completed hardware accelerator may be deployed at the datacenter, for example at a hardware acceleration module (e.g., the hardware acceleration module 218). The datacenter may then charge the user for usage of the accelerator blocks in the deployed hardware accelerator, as described above.

FIG. 8 illustrates a block diagram of an example computer program product, arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the accelerator assembly module 622 may undertake one or more of the tasks shown in FIG. 8 in response to the instructions 804 conveyed to the processor 604 by the medium 802 to perform actions associated with integrating hardware accelerators in a datacenter as described herein. Some of those instructions may include, for example, receiving customer accelerator block(s) for a hardware accelerator configuration from a customer, determining that the configuration specifies other accelerator block(s), retrieving the other accelerator block(s), forming a hardware accelerator by integrating the customer accelerator block(s) and the other accelerator block(s) according to the configuration while refraining from providing the other accelerator block(s) to the customer, and/or implementing the hardware accelerator, according to some embodiments described herein.

In some implementations, the signal bearing media 802 depicted in FIG. 8 may encompass computer-readable media 806, such as, but not limited to, a hard disk drive, a solid state drive, a Compact Disc (CD), a Digital Versatile Disk (DVD), a digital tape, memory, etc. In some implementations, the signal bearing media 802 may encompass recordable media 807, such as, but not limited to, memory, read/write (R/W) CDs, R/W DVDs, etc. In some implementations, the signal bearing media 802 may encompass communications media 810, such as, but not limited to, a digital aid/or an analog communication medium (e.g., a fiber optic cable, a waveguide, a wired communications link, a wireless communication link, etc.). Thus, for example, the program product 800 may be conveyed to one or more modules of the processor 604 by an RF signal bearing medium, where the signal bearing media 802 is conveyed by the wireless communications media 810 (e.g., a wireless communications medium conforming with the IEEE 802.11 standard).

According to some examples, a method is provided to integrate hardware accelerators in a datacenter. The method may include receiving a customer accelerator block for a hardware accelerator configuration, retrieving the other accelerator block upon determining that the hardware accelerator configuration specifies another accelerator block, turning a hardware accelerator by integrating the customer accelerator block and the other accelerator block at the datacenter according to the hardware accelerator configuration while refraining from providing the other accelerator block to a datacenter customer associated with the customer accelerator block, and deploying the hardware accelerator on a hardware acceleration module at the datacenter.

According to some embodiments, the hardware acceleration module may include a field-programmable gate array (FPGA). The method may further include receiving the customer acceleration block as a netlist and/or retrieving the other acceleration block as a netlist. The received customer acceleration block may include an accelerator front end and/or an accelerator back end. The hardware accelerator configuration may specify how the other accelerator block is to be integrated with the customer accelerator block.

According to other embodiments, the method may further include determining that the hardware accelerator configuration specifies multiple other accelerator blocks, at least two of the other accelerator blocks each associated with a different accelerator vendor, retrieving the other accelerator block from an accelerator library, and/or retrieving the other accelerator block from an accelerator marketplace and storing the retrieved other accelerator block in the accelerator library.

According to further embodiments, the method may further include monitoring use of the hardware accelerator at the datacenter and charging the datacenter customer for use of the other accelerator block, charging the datacenter customer based on a usage time and/or a number of uses, receiving a payment from the datacenter customer for use of the other accelerator block and forwarding at least a portion of the payment to a vendor of the other accelerator block, and/or providing the customer with a discount for use of the other accelerator block while testing the deployed hardware accelerator.

According to yet further embodiments, the method may include retrieving the other accelerator block from an accelerator marketplace via a customer account at the accelerator marketplace associated with the datacenter customer or a datacenter account at the accelerator marketplace associated with the datacenter. The customer account and/or the datacenter account may be associated with a rate-payment permission from the accelerator marketplace and/or an accelerator vendor operating in the accelerator marketplace. The customer account may include datacenter delivery instructions allowing the datacenter to retrieve the other accelerator block. The accelerator marketplace may include a delivery module configured to allow the datacenter to retrieve the other accelerator block based on the datacenter delivery instructions. The method may further include using an accounting module at the accelerator marketplace to correlate the retrieval of the other accelerator block with the customer account for tracking of business relationship data. The business relationship data may include datacenter use of the other accelerator block, customer use of the other accelerator block, and/or customer use of the datacenter.

According to other examples, an accelerator assembly module is provided to integrate hardware accelerators in a datacenter. The module may include a processing module, an accelerator intake module, and an acceleration integration module. The processing module may be configured to receive a customer accelerator block for a hardware accelerator configuration and determine that the hardware accelerator configuration specifies another accelerator block. The accelerator intake module may be configured to retrieve the other accelerator block. The accelerator integration module may be configured to form a hardware accelerator by integrating the customer accelerator block and the other accelerator block at the datacenter according to the hardware accelerator configuration, cause the hardware accelerator to be deployed on a hardware acceleration module at the datacenter, and refrain from providing the other accelerator block to a datacenter customer associated with the customer accelerator block.

According to some embodiments, the hardware acceleration module may include a field-programmable gate array (FPGA). The processing module may be further configured to receive the customer acceleration block as a netlist. The accelerator intake module may be further configured to retrieve the other acceleration block as a netlist. The received customer acceleration block may include an accelerator front end and/or an accelerator back end. The hardware accelerator configuration may specify how the other accelerator block is to be integrated with the customer accelerator block.

According to other embodiments, the processing module may be further configured to determine that the hardware accelerator configuration specifies multiple other accelerator blocks, at least two of the other accelerator blocks each associated with a different accelerator vendor. The accelerator intake module may be further configured to retrieve the other accelerator block from an accelerator library and/or retrieve the other accelerator block from an accelerator marketplace and store the retrieved other accelerator block in the accelerator library.

According to further embodiments, the processing module may be further configured to monitor use of the hardware accelerator at the datacenter and charge the datacenter customer for use of the other accelerator block, charge the datacenter customer based on a usage time and/or a number of uses, receive a payment from the datacenter customer for use of the other accelerator block and forward at least a portion of the payment to a vendor of the other accelerator block, and/or provide the customer with a discount for use of the other accelerator block while testing the deployed hardware accelerator.

According to yet further embodiments, the accelerator intake module may be further configured to retrieve the other accelerator block from an accelerator marketplace via a customer account at the accelerator marketplace associated with the datacenter customer or a datacenter account at the accelerator marketplace associated with the datacenter. The customer account and/or the datacenter account may be associated with a rate-payment permission from the accelerator marketplace and/or an accelerator vendor operating in the accelerator marketplace. The customer account may include datacenter delivery instructions allowing the datacenter to retrieve the other accelerator block. The accelerator marketplace may include a delivery module configured to allow the datacenter to retrieve the other accelerator block based on the datacenter delivery instructions. The processing module may be further configured to use an accounting module at the accelerator marketplace to correlate the retrieval of the other accelerator block with the customer account for tracking of business relationship data. The business relationship data may include datacenter use of the other accelerator block, customer use of the other accelerator block, and/or customer use of the datacenter.

According to further examples, a cloud-based datacenter is provided to integrate hardware accelerators locally. The datacenter may include at least one virtual machine (VM) operable to be executed on one or more physical machines, a hardware acceleration module associated with the at least one VM, and a datacenter controller. The datacenter controller may be configured to receive a customer accelerator block for a hardware accelerator configuration, retrieve the other accelerator block in response to a determination that the hardware accelerator configuration specifies another accelerator block, form a hardware accelerator by integrating the customer accelerator block and the other accelerator block locally according to the hardware accelerator configuration while refraining from providing the other accelerator block to a datacenter customer associated with the customer accelerator block, and deploy the hardware accelerator on the hardware acceleration module.

According to some embodiments, the hardware acceleration module may include a field-programmable gate array (FPGA). The datacenter controller may be further configured to receive the customer acceleration block as a netlist and/or retrieve the other acceleration block as a netlist. The received customer acceleration block may include an accelerator front end and/or an accelerator back end. The hardware accelerator configuration may specify how the other accelerator block is to be integrated with the customer accelerator block.

According to other embodiments, the datacenter controller may be further configured to determine that the hardware accelerator configuration specifies multiple other accelerator blocks, at least two of the other accelerator blocks each associated with a different accelerator vendor, retrieve the other accelerator block from an accelerator library, and/or retrieve the other accelerator block from an accelerator marketplace and store the retrieved other accelerator block in the accelerator library.

According to further embodiments, the datacenter controller may be further configured to monitor use of the hardware accelerator at the datacenter and charge the datacenter customer for use of the other accelerator block, charge the datacenter customer based on a usage time and/or a number of uses, receive a payment from the datacenter customer for use of the other accelerator block and forward at least a portion of the payment to a vendor of the other accelerator block, and/or provide the customer with a discount for use of the other accelerator block while testing the deployed hardware accelerator.

According to yet further embodiments, the datacenter controller may be further configured to retrieve the other accelerator block from an accelerator marketplace via a customer account at the accelerator marketplace associated with the datacenter customer or a datacenter account at the accelerator marketplace associated with the datacenter. The customer account and/or the datacenter account may be associated with a rate-payment permission from the accelerator marketplace and/or an accelerator vendor operating in the accelerator marketplace. The customer account may include datacenter delivery instructions allowing the datacenter to retrieve the other accelerator block. The accelerator marketplace may include a delivery module configured to allow the datacenter to retrieve the other accelerator block based on the datacenter delivery instructions. The datacenter controller may be further configured to use an accounting module at the accelerator marketplace to correlate the retrieval of the other accelerator block with the customer account for tracking of business relationship data. The business relationship data may include datacenter use of the other accelerator block, customer use of the other accelerator block, and/or customer use of the datacenter.

According to yet other examples, a computer readable medium may store instructions for integrating hardware accelerators in a datacenter. The instructions may include receiving a customer accelerator block for a hardware accelerator configuration, retrieving the other accelerator block upon determining that the hardware accelerator configuration specifies another accelerator block, forming a hardware accelerator by integrating the customer accelerator block and the other accelerator block at the datacenter according to the hardware accelerator configuration while refraining from providing the other accelerator block to a datacenter customer associated with the customer accelerator block, and deploying the hardware accelerator on a hardware acceleration module at the datacenter.

According to some embodiments, the hardware acceleration module may include a field-programmable gate array (FPGA). The instructions may further include receiving the customer acceleration block as a netlist and/or retrieving the other acceleration block as a netlist. The received customer acceleration block may include an accelerator front end and/or an accelerator back end. The hardware accelerator configuration may specify how the other accelerator block is to be integrated with the customer accelerator block.

According to other embodiments, the instructions may further include determining that the hardware accelerator configuration specifies multiple other accelerator blocks, at least two of the other accelerator blocks each associated with a different accelerator vendor, retrieving the other accelerator block from an accelerator library, and/or retrieving the other accelerator block from an accelerator marketplace and storing the retrieved other accelerator block in the accelerator library.

According to further embodiments, the instructions may further include monitoring use of the hardware accelerator at the datacenter and charging the datacenter customer for use of the other accelerator block, charging the datacenter customer based on a usage time and/or a number of uses, receiving a payment from the datacenter customer for use of the other accelerator block and forwarding at least a portion of the payment to a vendor of the other accelerator block, and/or providing the customer with a discount for use of the other accelerator block while testing the deployed hardware accelerator.

According to yet further embodiments, the instructions may include retrieving the other accelerator block from an accelerator marketplace via a customer account at the accelerator marketplace associated with the datacenter customer or a datacenter account at the accelerator marketplace associated with the datacenter. The customer account and/or the datacenter account may be associated with a rate-payment permission from the accelerator marketplace and/or an accelerator vendor operating in the accelerator marketplace. The customer account may include datacenter delivery instructions allowing the datacenter to retrieve the other accelerator block. The accelerator marketplace may include a delivery module configured to allow the datacenter to retrieve the other accelerator block based on the datacenter delivery instructions. The instructions may further include using an accounting module at the accelerator marketplace to correlate the retrieval of the other accelerator block with the customer account for tracking of business relationship data. The business relationship data may include datacenter use of the other accelerator block, customer use of the other accelerator block, and/or customer use of the datacenter.

According to yet further examples, an accelerator marketplace system configured to supply accelerator blocks to customers is provided. An example marketplace system may include a data store configured to store a plurality of third-party accelerator blocks and one or more servers configured to execute a customer account management module and a delivery module. The customer account management module may allow a customer to select at least one of the plurality of third-party accelerator blocks and provide at least one accelerator-block-delivery instruction specifying a destination. The delivery module may deliver the selected at least one of the plurality of third-party accelerator blocks to the destination based on the at least one accelerator-block-delivery instruction.

According to some examples, the destination may include a datacenter and/or an intake module associated with the datacenter. The at least one customer account may be associated with a rate-payment permission from at least one of the marketplace system and an accelerator vendor providing at least one of the plurality of third-party accelerator blocks. The customer account management module may also correlate the at least one customer account, the selected at least one of the plurality of third-party accelerator blocks, and the destination for tracking of business relationship data. The business relationship data may include use of the selected at least one of the plurality of third-party accelerator blocks by a datacenter associated with the destination, use of the selected at least one of the plurality of third-party accelerator blocks by the customer, and/or use of the datacenter by the customer. The customer account management module may be associated with the marketplace system and/or a datacenter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is tier the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A atone, B alone, C alone, A and B together, A. and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to integrate hardware accelerators in a datacenter, the method comprising:
    receiving a customer accelerator block as a digital file;
    receiving a hardware accelerator configuration in addition to the customer accelerator block, wherein the hardware accelerator configuration specifies at least:
        a second accelerator block associated with an accelerator vendor, wherein the second accelerator block is different from the customer accelerator block, wherein the second accelerator block is to be used to configure a hardware accelerator in the datacenter, and wherein the hardware accelerator includes a programmable hardware processor, and
        physical connections of one or more particular input nodes and one or more particular output nodes of the programmable hardware processor as specified in the second accelerator block, to one or more particular input nodes and one or more particular output nodes of the programmable hardware processor as specified in the customer accelerator block;
    in response to determining that the hardware accelerator configuration specifies the second accelerator block, retrieving a second digital file corresponding to the second accelerator block from one of: an accelerator library or an accelerator marketplace;
    providing a datacenter customer account associated with the customer accelerator block;
    forming the hardware accelerator by integrating the customer accelerator block and the second accelerator block according to the hardware accelerator configuration by physically connecting the one or more particular input nodes and the one or more particular output nodes of the programmable hardware processor as specified in the customer accelerator block, to the one or more particular input nodes and the one or more particular output nodes of the programmable hardware processor as specified in the second accelerator block, at the datacenter as specified in the hardware accelerator configuration;
    after forming the hardware accelerator, providing the programmable hardware processor to a virtual machine executing in the datacenter, wherein the virtual machine is associated with the datacenter customer account; and
    monitoring use of the hardware accelerator by the virtual machine at the datacenter to facilitate charging the datacenter customer account for use of the second accelerator block.

2. The method of claim 1, further comprising:
    determining that the hardware accelerator configuration specifies a plurality of second accelerator blocks, wherein at least two of the plurality of second accelerator blocks are each associated with respective accelerator vendors, which are different from each other.

3. The method of claim 1, wherein:
    retrieving the second accelerator block from one of the accelerator library or the accelerator marketplace comprises retrieving the second accelerator block from the accelerator marketplace, and
    the method further comprises storing the retrieved second accelerator block in the accelerator library after the second accelerator block is retrieved from the accelerator marketplace.

4. The method of claim 1, further comprising:
    receiving a payment from the datacenter customer account for use of the second accelerator block; and
    forwarding at least a portion of the payment to the accelerator vendor associated with the second accelerator block.

5. The method of claim 1, further comprising providing the datacenter customer account with a discount for use of the second accelerator block while testing the deployed hardware accelerator.

6. The method of claim 1, wherein retrieving the second accelerator block from one of the accelerator library or the accelerator marketplace comprises retrieving the second accelerator block from the accelerator marketplace, and wherein retrieving the second accelerator block from the accelerator marketplace comprises retrieving the second accelerator block via:
    a customer account, at the accelerator marketplace, associated with the datacenter customer account, or
    a datacenter account, at the accelerator marketplace, associated with the datacenter.

7. The method of claim 6, wherein at least one of the customer account and the datacenter account is associated with a rate-payment permission from at least one of the accelerator marketplace and the accelerator vendor which operates in the accelerator marketplace.

8. An apparatus to integrate hardware accelerators in a datacenter, the apparatus comprising:
    a processor configured to:
        obtain a customer accelerator block as a digital file;
        obtain a hardware accelerator configuration via a customer account, wherein the hardware accelerator configuration specifies a second accelerator block, different from the customer accelerator block, wherein the second accelerator block is associated with an accelerator vendor, wherein the second accelerator block is to be used to configure a hardware accelerator in the datacenter, and wherein the hardware accelerator includes a programmable hardware processor;
retrieve a second digital file corresponding to the second accelerator block; and
monitor a use of the second accelerator block in the hardware accelerator at the datacenter;
an accelerator intake module communicatively coupled to the processor, wherein the accelerator intake module is configured to:
retrieve the second accelerator block from an accelerator marketplace via:
the customer account, at the accelerator marketplace, associated with a datacenter customer, or
a datacenter account, at the accelerator marketplace, associated with the datacenter; and
an accelerator integration module communicatively coupled to the processor and the accelerator intake module, wherein the accelerator integration module is configured to:
form the hardware accelerator by integration of the customer accelerator block and the second accelerator block at the datacenter according to the hardware accelerator configuration, wherein the hardware accelerator configuration specifies physical connections of one or more particular input nodes and one or more particular output nodes of the programmable hardware processor as specified in the second accelerator block, to one or more particular input nodes and one or more particular output nodes of the programmable hardware processor as specified in the customer accelerator block;
provide the hardware accelerator to a virtual machine executing at the datacenter, wherein the virtual machine is associated with the customer account; and
charge the customer account, which is associated with the customer accelerator block, for the use of the second accelerator block.

9. The apparatus of claim 8, wherein at least one of the customer account and the datacenter account is associated with a rate-payment permission from at least one of the accelerator marketplace and the accelerator vendor, wherein the accelerator vendor operates in the accelerator marketplace.

10. The apparatus of claim 8, wherein the customer account includes datacenter delivery instructions that allow the datacenter to retrieve the second accelerator block.

11. The apparatus of claim 10, wherein the accelerator marketplace includes a delivery module configured to allow the datacenter to retrieve the second accelerator block based on the datacenter delivery instructions.

12. The apparatus of claim 8, wherein the processor is further configured to use an accounting module, at the accelerator marketplace, to correlate the retrieval of the second accelerator block with the customer account to track business relationship data.

13. The apparatus of claim 12, wherein the business relationship data includes at least one of:
datacenter use of the second accelerator block,
customer use of the second accelerator block, and
customer use of the datacenter.

14. A cloud-based datacenter configured to integrate hardware accelerators locally, the cloud-based datacenter comprising:
at least one virtual machine (VM) operable to be executed on one or more physical machines;
a hardware acceleration module associated with the at least one VM; and
a datacenter controller, communicatively coupled to the hardware acceleration module, configured to:
receive a customer accelerator block as a digital file;
receive a hardware accelerator configuration, wherein the hardware accelerator configuration is indicative of a hardware accelerator to be implemented at the cloud-based datacenter, wherein the hardware accelerator is implemented on a programmable hardware processor, and wherein the hardware accelerator is associated with one or more applications executed on the at least one VM;
in response to a determination that the hardware accelerator configuration specifies a second accelerator block, different from the customer accelerator block, wherein the second accelerator block is to be used to configure the hardware acceleration module, retrieve a second digital file corresponding to the second accelerator block;
provide a datacenter customer account associated with the customer accelerator block;
form the hardware accelerator by integration of the customer accelerator block and the second accelerator block on the hardware acceleration module locally according to the hardware accelerator configuration, wherein the hardware accelerator formed on the hardware acceleration module includes physical connections of one or more particular input nodes and one or more particular output nodes of the programmable hardware processor as specified in the second accelerator block, to one or more particular input nodes and one or more particular output nodes of the programmable hardware processor as specified in the customer accelerator block;
provide the hardware acceleration module to the at least one virtual machine; and
monitor use of the hardware acceleration module by the at least one virtual machine such that the datacenter customer account is charged for use of the second accelerator block in the hardware accelerator module based on at least one of a usage time and a number of uses.

15. The cloud-based datacenter of claim 14, wherein the hardware acceleration module includes a field-programmable gate array (FPGA).

16. The cloud-based datacenter of claim 14, wherein the datacenter controller is configured to at least one of:
receive the customer accelerator block as a netlist; and
retrieve the second accelerator block as a netlist.

17. The cloud-based datacenter of claim 14, wherein the received customer accelerator block includes at least one of an accelerator front end and an accelerator back end.

* * * * *